United States Patent
Yokoyama et al.

[19]

[11] Patent Number: 5,864,771
[45] Date of Patent: Jan. 26, 1999

[54] SAFE DRIVING SUPPORT SYSTEM

[75] Inventors: Shoji Yokoyama, Tokyo-to; Seiichi Suzuki, Tokyo-to; Koji Hori, Tokyo-to; Nobuaki Miki, Aichi-ken; Muneo Kusafuka, Aichi-ken; Yoshitaka Murase, Aichi-ken, all of Japan

[73] Assignee: Kabushikikaisha Equos Research, Japan

[21] Appl. No.: 654,991

[22] Filed: May 29, 1996

[30] Foreign Application Priority Data

Jun. 2, 1995  [JP]  Japan .................................. 7-158758

[51] Int. Cl.⁶ .............................. G06F 7/00; G01C 21/00
[52] U.S. Cl. ................................ 701/208; 701/62; 701/93
[58] Field of Search .................................. 701/53, 54, 93, 701/211, 208, 62; 340/441, 996

[56] References Cited

U.S. PATENT DOCUMENTS

| | | | |
|---|---|---|---|
| 5,146,219 | 9/1992 | Zechnall | 701/1 |
| 5,201,381 | 4/1993 | Neuffer et al. | 180/179 |
| 5,247,440 | 9/1993 | Capurka et al. | 364/424.05 |
| 5,365,449 | 11/1994 | Kashiwazaki | 364/449 |
| 5,412,573 | 5/1995 | Barnea et al. | 364/449 |
| 5,485,161 | 1/1996 | Vaughn | 342/357 |
| 5,485,381 | 1/1996 | Heintz et al. | 364/426.04 |

*Primary Examiner*—Michael Zanelli
*Attorney, Agent, or Firm*—Lorusso & Loud

[57] ABSTRACT

A safe drive support system includes a memory unit for storing road-map data including a safe driving area data, a present location detecting unit for detecting a present location of the vehicle, a determining unit for determining as to whether the present location of the vehicle is in the safe driving area according to a detection result by the present location detecting unit, and limiting unit for limiting driving torque or starting torque of the vehicle in the area according to a determination result by the determining unit. In the safe driving area, the limiting operation is carried out by, for example, setting the gear position of start to the second position so as to prevent the vehicle from starting suddenly. An operational angle of a throttle valve is limited at a predetermined angle to limit the output of the engine to suppress an excess speed when an accelerator is stepped on strongly.

14 Claims, 1 Drawing Sheet

SAFE DRIVING SUPPORT SYSTEM

BACKGROUND OF THE INVENTION

The present invention relates to a system for supporting safe driving as automatically controlling various conditions of a vehicle such as an automobile. The present invention, in particular, relates to a safe driving support system that performs in cooperation with a navigation system of the vehicle that guides a driver according to a selected route from a present location of the vehicle to a destination.

Recently, a navigation system has come into wide use. The navigation system comprises means for storing road-map data, means for detecting a present location of a vehicle by a GPS, a beacon, various bearing sensors or the like. The navigation system searches a route from the detected present location of the vehicle to the destination with reference to the road-map data and displays the determined route together with a map near around on a display screen so as to guide a driver.

The road-map data includes road data that indicates coordinates of main intersections of roads, types of the roads and width of the roads and coordinate data of facilities near around, rail ways, rivers or the like. Accordingly, the map near around displayed on a display screen of the navigation system shows the main intersections, buildings, stations or the like that may be landmarks for the driver as driving the vehicle along the determined route.

However, the road-map data stored in the conventional navigation system fails to include a data on an area, such as a house complex region, an apartment building complex region, a school zone or the like where there are many pedestrians and therefore safe driving should be performed. The area is referred to a safe driving area hereinbelow.

Safe driving with special attentiveness is required in the safe driving area because of the many pedestrians. The conventional navigation system includes no data on the safe driving area so that the navigation system fails to determine as to whether the present location or position of the vehicle is in the area or not. It is therefore not possible to display any guidance on the display screen to direct the driver to keep the safe driving.

Some drivers may have an ability to determine that the present location is in the safe driving area according to the map information displayed on the screen. It, however, depends on the driver's judgment or driving skill to do the actual safe driving of preventing sudden start and sudden acceleration as considering or regarding an accidental appearance of a pedestrian. There is no means in the vehicle for actively preventing the sudden start and sudden acceleration in the safe driving area.

SUMMARY OF THE INVENTION

It is, therefore, an object of the present invention to solve the problem mentioned above and to provide a system of supporting that the safe driving as pedestrian-first is always performed in the safe driving area.

The object is achieved by the present invention of a safe driving support system for a vehicle that comprises storing means for storing road-map data including a data for the safe driving area, present location detecting means for detecting a present location of the vehicle, determining means for determining whether the present location of the vehicle is in the safe driving area according to a detection result by the present location detecting means, limiting means for limiting driving torque and/or starting torque of the vehicle in the safe driving area according to a determination result by the determining means.

The safe driving support system for a vehicle of the present invention may be configured by sharing some elements or functions with a navigation system. That is, the navigation system comprises road-map data storing means for storing road-map data, present location detecting means for detecting a present location of a vehicle, and route searching means for searching and determining a route to a destination according to the road-map data stored in the road-map storing means and the present location of the vehicle detected by the present location detecting means. The safe driving support system of the present invention further comprises means for storing a data for a safe driving area, determining means for determining whether the present location of the vehicle is in the safe driving area according to a detection result by the present location detecting means, and limiting means for limiting driving torque and/or starting torque of the vehicle according to a determination result by the determining means.

An object to be limited by the limiting means is, for example, a shift mode of a speed change gear or an output of an engine of the vehicle. That is, limiting means prevents the sudden start or sudden acceleration in the safe driving area by selecting a shift mode of the speed change gear or by controlling the output of the engine.

The safe driving area mainly directs, as mentioned above, an area, such as a house complex region, an apartment building complex region, a school zone or the like where there are many pedestrians and therefore safe driving as pedestrian-first should be performed. It is noted that the safe driving area also directs or includes a position, such as a blinded corner hard to notice vehicle coming on the opposite lane, a narrow road and a steep slope, and an area where safe driving is particularly required depending on a condition of a road or a route.

The system of the present invention makes sure the safe driving as pedestrian-first in the safe driving area by controlling automatically the shift mode of the speed change gear or the output of the engine to limit the driving torque and/or starting torque of the vehicle when the present position of the vehicle is in the safe driving area.

BRIEF DESCRIPTION OF THE DRAWINGS

The present invention is illustrated in the accompanying drawing, in which.

DESCRIPTION OF THE PREFERRED EMBODIMENT

Figure 1:
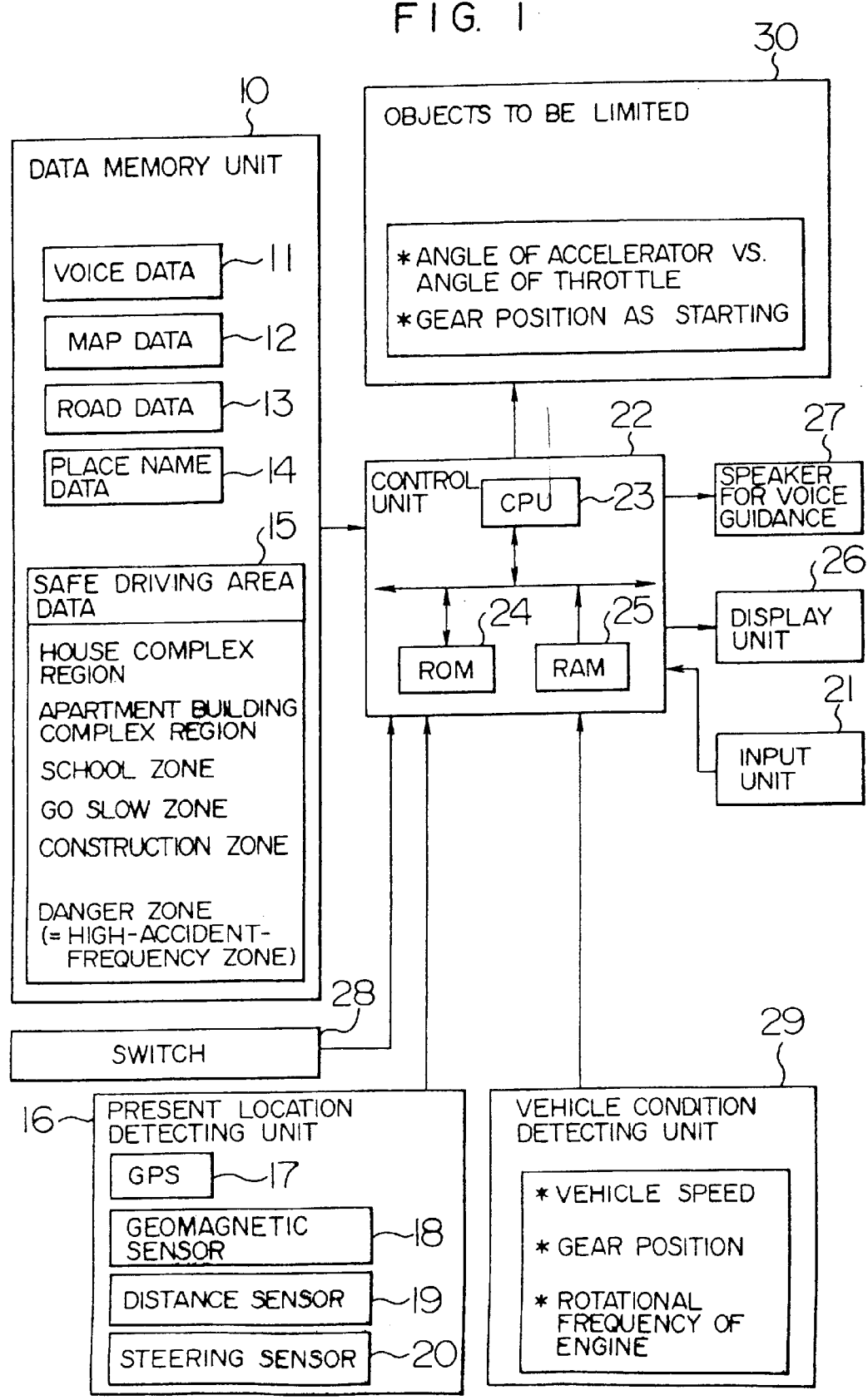
FIG. 1 is a block diagram of a safe driving support system of an embodiment of the present invention.

FIG. 1 shows a block diagram of a safe driving support system of an embodiment according to the present invention. The safe driving support system shares some elements with a conventional navigation system.

A data memory unit 10 of the navigation system comprises a data storing medium such as a CD-ROM or an IC card and stores many kinds of data such as a voice data 11, a map data 12, a road data 13, a place name data 14.

A present location detecting unit 16 comprises a GPS satellite receiver 17 for receiving a radio wave from a GPS satellite to determine the present location of the vehicle. The present location detecting unit 16 is so constructed that it can perform precise location detection by utilizing a correction data with respect to a direction or a real driving distance detected by further sensors such as a geomagnetic sensor 18, a distance sensor 19 and a steering sensor 20.

Location data such as a present location (a point of departure) and a destination are input by a driver with an input unit 21 of a keyboard or the like.

Various data are delivered to a control unit 22 from the input unit 21, the data memory unit 10 and the present location detecting unit 16. A CPU 23 searches and determines a route from the present location to the destination according to a program stored in a ROM 24 and based on the various data delivered. A RAM 25 is a working memory in which a data of the route thus determined is stored. The ROM 24 and RAM 25 are in connection with the CPU 23 by bus lines.

The CPU 23 synthesizes a voice guide signal from the voice data 11 according to the processing result thereby. The voice guide signal is output from a speaker unit 27 to give the driver a route guidance. A display unit 26, such as a CRT display or a liquid crystal display, displays a road map constructed on the basis of the map data 12 and the road data 13 or the like. The present location of the vehicle detected by the present location detecting unit 16 is pointed in the road map shown on the display unit 26 and the route searched and determined by the CPU 23 are also pointed thereon.

Almost all the above-mentioned is a known structure as a conventional navigation system. U.S. Pat. No. 5,365,449 entitled NAVIGATION SYSTEM and a U.S. patent application Ser. No. 08/546,956, entitled HYBRID VEHICLE, filed on Oct. 23, 1995 are incorporated herein by reference.

In the present embodiment, the data memory unit 10 further stores a safe driving area data 15 for operating the present system. That is, a house complex region, an apartment building complex region, a school zone or the like where, in particular, there are many pedestrians are stored as the safe driving area. Furthermore, a Go Slow lane, a repairing zone, a danger zone (a high-accident-frequency zone) or the like may be also stored as the safe driving area.

A switch 28 for turning on and off the operation of the system is provided. An ignition key may be used as the switch 28. In this case, the safe driving support system starts when the ignition key is turned on and the system stops when the ignition key is turned off. The switch 28, which is separated from the ignition key, may be disposed on a desired position of the display unit 26 as a manually operable switch. In this case, the driver handles the switch 28 on his or her judgment to start or stop the system.

Furthermore, the system includes a vehicle condition detecting unit 29 for detecting a present speed, a present position of gear, a present rotational frequency of an engine or the like. The objects to be detected by the vehicle condition detecting unit 29 are the final objects 30 to be limited by the safe driving support system.

Description in operation of the safe driving support system of the present embodiment will be made hereinbelow.

The system starts by turning on the switch 28. The control 22 determines whether the vehicle is in the safe driving area according to the present location of the vehicle detected by the present location detecting unit 16 and the safe driving area data 15 read from the data memory unit 10. The control unit 22 appropriately controls the objects 30 to be limited to perform the safe driving by referring to the detection results from the vehicle condition detecting unit 29 when it is determined that the vehicle is in the safe driving area by the unit 22.

In the safe driving area, the limiting operation is carried out by, for example, setting the gear position of start to the second position so as to prevent the vehicle from starting suddenly. An operational angle of a throttle valve is limited at a predetermined angle to limit the output of the engine to suppress an excessive speed even though an accelerator is stepped on strongly.

Furthermore, the speed limit data of respective roads are stored as the safe driving area data. When the present speed of the vehicle detected by the vehicle condition detecting unit 29 exceeds the speed limit data, the operational angle of the throttle valve is decreased by suppressing an output negative pressure of an accelerator pedal servo valve to prevent increase of the vehicle speed.

Further, it is desirable to inform the driver of going in and out the safe driving area to direct the driver's attention into the safe driving. The display unit 26 and the speaker for voice guidance 27 disposed in the navigation system may be used as the information means thereof. That is, the display unit 26 displays information of whether the vehicle is going in or out the safe driving area and the speaker for voice guidance 27 gives the driver the information as a voice guidance.

As mentioned above, in the present system, the vehicle is automatically controlled to be driven safely as pedestrian-first in an area where there are particularly large number of pedestrians. Further, present system can give a driver information of safe driving. The present system, therefore, makes a great contribution to the safe driving and prevention of the traffic accident.

The present system may be constructed as sharing some elements with the conventional navigation system. That is, the memory unit and the present location detecting means such as GPS or the like of the navigation system are used as elements of the system. Therefore, the present system can be constructed effectively with a low cost.

Data stored in the data memory device 10 are renewed by inputting new data with the input unit 21. The new data, which comprises at least a new road data and a new safe driving area data, are stored in a medium such as a CD and a FD.

Although the invention has been disclosed in the context of a certain preferred embodiment, it will be understood that the present invention extends beyond the specifically disclosed embodiment to other alternative embodiments of the invention. Thus it is intended that the scope of the invention should not be limited by the disclosed embodiment, but should be determined by reference to the claims that follow.

What is claimed is:

1. A safe driving support system for a vehicle operable within a range of driving torque and comprising:

a memory unit containing road-map data for a first area including data for a second area, within said first area, wherein safe driving is particularly needed;

present location detecting means for detecting a present location of the vehicle;

determining means for determining whether or not the detected present location of the vehicle is within said second area; and limiting means for imposing a predetermined upper limit on driving torque of the vehicle in said second area, which predetermined upper limit reduces said operable range, responsive to a determination by said determining means that the detected present location is within said second area.

2. A safe driving support system for a vehicle according to claim 1, wherein said limiting means controls a speed change gear mechanism of said vehicle to reduce the number of gear stages available for selection.

3. A safe driving support system for a vehicle according to claim 1, wherein said limiting means limits engine output of said vehicle.

4. A safe driving support system for a vehicle according to claim 1, further comprising means for informing a driver of the vehicle when the vehicle enters and leaves said second area.

5. A safe driving support system according to claim 1 wherein said limiting means limits the angle of opening of a throttle valve on an engine powering the vehicle.

6. A safe driving support system for a vehicle operable within a range of starting torque and comprising:
   a memory unit containing road-map data for a first area including data for a second area, within said first area, wherein safe driving is particularly needed;
   present location detecting means for detecting a present location of the vehicle;
   determining means for determining whether or not the detected present location of the vehicle is within said second area; and
   limiting means for limiting starting torque for starting said vehicle in said area responsive to a determination by said determining means that the detected present location is within said second area.

7. A safe driving support system for a vehicle according to claim 6, wherein said limiting means controls a speed change gear mechanism of said vehicle to reduce the number of gear stages available for selection.

8. A safe driving support system for a vehicle according to claim 6, wherein said limiting means which imposes a predetermined upper limit on engine output of said vehicle.

9. A safe driving support system for a vehicle according to claim 6, further comprising means for informing a driver of the vehicle when the vehicle enters and leaves said second area.

10. A safe driving support system according to claim 6 wherein said limiting means limits the range of gear stages which may be selected in starting to second gear.

11. A method of controlling a vehicle operable within at least one of ranges for starting torque and driving torque, comprising:
    providing, stored in a memory, road map data for a first area including data identifying a second area, within said first area wherein safe driving is particularly needed;
    detecting a present location of said vehicle;
    determining whether or not said vehicle is in said second area requiring safe driving according to results obtained in the detecting step;
    limiting any one of driving torque and starting torque ranges when the vehicle is in said second area by imposing a predetermined upper limit on the one range, which predetermined upper limit reduces said one range.

12. A method according to claim 11, wherein a speed change gear mechanism of said vehicle is controlled in the limiting step to reduce the number of gear stages available for selection.

13. A method according to claim 11, wherein engine output of said vehicle is controlled in the limiting step.

14. A method according to claim 11, further comprising informing a driver when the vehicle enters and leaves said second area.

* * * * *

UNITED STATES PATENT AND TRADEMARK OFFICE
CERTIFICATE OF CORRECTION

PATENT NO. : 5,864,771
DATED : January 26, 1999
INVENTOR(S) : Yokoyama et al

It is certified that error appears in the above-identified patent and that said Letters Patent is hereby corrected as shown below:

On the title page: Item [73] should read -- Kabushikikaisha Equos Research, and Aisin Aw Co., Ltd --.

Signed and Sealed this

Twenty-first Day of December, 1999

Attest:

Q. TODD DICKINSON

*Attesting Officer*　　　*Acting Commissioner of Patents and Trademarks*